United States Patent [19]

Hafner et al.

[11] Patent Number: 4,779,537
[45] Date of Patent: Oct. 25, 1988

[54] TRACK RAIL

[75] Inventors: Josef Hafner, Groebenzell; Werner Bergmeier, Munich; Rolf Schoenenberger, Landsberg, all of Fed. Rep. of Germany

[73] Assignee: Veit GmbH & Co., Fed. Rep. of Germany

[21] Appl. No.: 916,301

[22] Filed: Oct. 7, 1986

[30] Foreign Application Priority Data

Oct. 7, 1985 [DE] Fed. Rep. of Germany ....... 3535758

[51] Int. Cl.$^4$ ............................................. E01B 25/22
[52] U.S. Cl. ...................................... 104/93; 104/95; 104/107; 104/244
[58] Field of Search ............... 104/106, 107, 109, 110, 104/111, 93–95, 89, 242, 244

[56] References Cited

U.S. PATENT DOCUMENTS

| | | | |
|---|---|---|---|
| 1,115,029 | 10/1914 | Shepard | 104/107 |
| 3,352,252 | 11/1967 | Bertolini | 104/106 |
| 4,265,181 | 5/1981 | Schreyer et al. | 104/95 X |
| 4,393,785 | 7/1983 | Hortnagel | 104/110 |
| 4,520,733 | 6/1985 | Willmann | 104/110 X |

FOREIGN PATENT DOCUMENTS

1806381  5/1970  Fed. Rep. of Germany ...... 104/106

Primary Examiner—Sherman D. Basinger
Attorney, Agent, or Firm—Darby & Darby

[57] ABSTRACT

The invention relates to a track rail for a suspension conveyor system particularly for the convenience of materials in the textile industry, having a cross-sectional configuration comprising a pair of roof-shaped converging legs each formed with a roller track surface for one of a pair of track rollers on its upper side, and connected to a carrier rail by an upper carrier web extending in the symmetry plane, said track rollers of said track roller pair defining a derail gap and being mounted in a common yoke with their axes in oblique alignment relative to one another, permitting them to be detached from said track rail by lifting said yoke and tilting it transversely of said track rail. Known track rails are formed as a welded construction composed of continuous steel sections and web sections as the carrier web. They are heavy and permit only the use of center-suspension track roller pairs to travel thereon. Due moreover to the material accumulation at the intersection of the legs thay have unsatisfactory load-carrying properties, and their assembly is laborious and troublesome. According to the invention there is provided a universally employable track rail of lower weight and improved usefulness as compared to the known construction by providing between said legs a transverse web formed integrally therewith and extending transversely of said symmetry plane so as to define a closed cavity with said legs.

30 Claims, 5 Drawing Sheets

TRACK RAIL

DESCRIPTION

The present invention relates to a track rail.

A known track rail is a steel angle profile member with an open underside between its legs, welded in the conveyor path rail to a continuous steel profile member formed for instance as a circular tube, with the interposition of web sections acting as the carrier web. The construction of a conveyor path of a suspension conveyor system is complicated by the fact that it has to be so to speak custom-built of numerous individual parts. The track rail is only suitable for travel thereon of center-suspension track roller pairs. The open underside of the track rail permits the track roller pair to be detached, on the other and, however, it requires the application of additional components for preventing the roller pair from being detached at derail prevent sections of the conveyor path for safety reasons. The open angular profile of the track rail results in high torsional loads and an excessive material accumulation at the upper side of the track rail. Due to the construction described, the weight of the track rail and thus of a unit length of the conveyor path is excessively high. The horizontal asymmetry of the track rail requires upwards and downwards directed bends to be formed in a different manner. The welding warp occurring on assembly of a conveyor path results in excessive production tolerances. Likewise, the accurately vertical orientation of the symmetry plane of the track rail is not assured after assembly. The great weight of the track rail and the conveyor path lead to high shipping cost. The material of the track rail makes expensive corrosion protection indispensable. Connection and abutment locations of the conveyor path require the employ of different connecting elements for the carrier web and the track rail.

It is an object of the present invention to provide a track rail of the type defined in the introduction which is suitable for universal employ under varying conditions while being more stable having a higher load-carrying capacity and being of lower weight than the known rail.

This object is attained according to the present invention.

The employ of the transverse web results in the provision of a hollow profile member ensuring a higher load-carrying capacity of the track rail, so that the track rail may be of a lighter construction than the known one. The transverse web cooperates with the legs and the cavity to result in a favorable inertia and resistance momentum of the track rail. The transverse web also ensures a uniform spacing of the legs, thus facilitating the formation of upwards and downwards directed bends. The load acting on the track rail at the upper connection of the legs is reduced, because the transverse web located therebelow exerts an additional lateral stiffening action.

The construction of this invention results in a relatively low height of the rail combined with a high load-carrying capacity. A material accumulation adjacent the connection of the two legs is avoided. The position of the neutral chord within the cross-section of the track rail may be readily and accurately predetermined or placed at the optimum position with regard to the loads to be carried.

An advantage of the invention is that it provides for a high-strength connection between the carrier web and the track rail while always ensuring that the symmetry plane of the track rail is accurately vertical. The integrally formed carrier web also eliminates the formerly required fastidious operations for connecting the track rail to the carrier web sections, because the integrally formed carrier web is to be directly connected to the carrier rail.

One advantageous embodiment permits the load-carrying capacity of the thus composed conveyor path rail as well as its weight per unit length to be accurately predetermined by suitably selecting the size and number of the windows. Due to the selected distance between the window edge and the underside of the transverse web, the positioning of certain windows automatically results in the provision on the conveyor path of locations whereat the track rollers can be detached. The width of the track roller paths or of the legs, respectively, may in this context by all means be greater than the derail gap width.

A further advantageous characteristic is that the carrier web increases the rigidity of the track rail while not interfering with the desired derailing of the track roller pair. Thanks to the resulting low height of the track rail, the open underside of the track rail possibly extending up to the transverse web need not be used at all for detaching the track roller pair, whereby the detaching operation is facilitated. It is however even possible that the transverse web connects the free ends of the legs directly to one another.

According to one aspect of the invention a derailment of the track roller pair is no longer possible without additional provisions in a derail prevent section.

Another important aspect is that the longitudinal grooves do not impair the rigidity and load-carrying capacity of the track rail while permitting the attachment and positioning of auxiliary devices. As an additional effect they may even provide for a possibly desired resiliency of the web in the vertical direction.

A further advantageous aspect is that the projections 7 result in material accumulations at this portion of the cross-section, with the resultant favorable effect on the load-carrying capacity and the inertia and resistance moments of the track rail.

Also advantageous is that the loads exerted by suspensions or supports engaging the projections 7 are distributed over large areas.

The undercut groove within the cross-section of the track rail is destined for secondary purposes, such as for the attachment or mounting of auxiliary devices or mounting members, which are then displaceable in the longitudinal direction of the track rail and may be locked at any location.

A further advantage is that movably inserted members are safely supported and guided on the guide or support surfaces.

The embodiments described above offer the further advantage of permitting slide contact rails or power supply cables to be accommodated for instance in the longitudinal grooves. It is also possible to provide plastic liners for the roller tracks which may be additionally secured by engagement with the lower groove of the track rail. When the track rail is mounted at a different orientation, the surfaces on the projections at the ends of the legs may also act as parts of roller tracks for track rollers of a different type or mounting. Rollers may also travel on the support surfaces at the underside of the transverse web when the track rail is mounted at a different orientation. In other words, the invention provides a track rail having a complex profile permitting the track rail to be employed for different purposes which may evolve from the general outlay of a conveyor system.

In one embodiment the track rail per se forms an integral part of the conveyor path rail which may be used for installing the conveyor path in the manner of an assembly kit. The employ of this rail eliminates the need for connecting the track rail to the carrier rail and the necessity of a continuous custom-built construction. The conveyor path rails have an advantageous configuration with regard to their assembly and mounting. In this embodiment it is also possible to eliminate the transverse web of the track rail or the carrier rail, respectively, for certain applications.

In the sense of the assembly kit principle of the invention the conveyor path rail may be mounted at least at two different orientations, with the track rollers always travelling on the rail located at the lower position. The provisions of a derail section or a derail prevent section is thus determined by the mounting orientation.

One embodiment of the invention offers the further advantage that the longitudinal reinforcement accommodated in the cavity increases the load-carrying capacity of the track rail or the conveyor path rail. The reinforcement may be in the form of reinforcement strips or webs inserted in the cavity and possibly secured therein by a cast or foamed material.

The additional rail secured mirror-image-wise either to the track rail or the carrier rail by making use of the specific profile thereof permits the load-carrying capacity of the conveyor path rail to be increased either continuously or over parts of its length. To comply with the assembly kit principle the additional rail likewise has the profile of the track rail.

The roller track profile described herein offers the possibility of additionally and simultaneously employing different track roller systems. The roller track profiles can be mounted in a simple manner, for instance in the groove at the bottom side. As a result it is thus possible to employ for instance center-suspended and lateral-suspension roller yokes simultaneously on one and the same conveyor path.

According to another aspect of the invention the profile of the track rail may originally be designed to accommodate different roller yoke systems, provisions being preferably made to ensure that the roller tracks of the compatible systems do not interfere with the roller yokes of other systems. Another multiple-system track rail may also be employed without carrier web and carrier rail as by providing a suitable one-piece construction. In this embodiment the basic cross-sectional shape is retained and only modified with a view to the additional purpose. The transverse web within the cross-section is not absolutely necessary.

The barrier member of the invention may be selectively attached or removed to comply with prevailing requirements. The design of the track rail in accordance with the modified assembly kit principle again permits the system to be subsequently modified in a simple manner as for adaptation to varying operational conditions.

One embodiment of the invention offers the advantage to reliably preventing unintentional derailment while permitting intentional derailment at any time.

In accordance with one embodiment of the invention the design of the track rail and its integration in the conveyor path rail is advantageously utilized for mounting the fastener means, suspension means or support means of a conveyor path. The loads acting on the conveyor path by travel therealong are smoothl transmitted from the longitudinal grooves to the fastener means and from there to the suspension of the conveyor path. The coupling of mutually abutting conveyor path sections is likewise facilitated and may for instance be accomplished by the insertion of pin-shaped coupling elements in the longitudinal grooves, so that the track rails are positively prevented from shifting relative to one another.

The fastener means received in the longitudinal grooves permit the auxiliary installations to be secured in a particularly simple manner.

The design of the track rail and also of the conveyor path rail of the invention is also advantageous in the case of power-driven conveyors. According to this aspect of the invention the leading and trailing runs are accommodated in the grooves of the rails without the requirement of complicated mounting and adjustment means.

Within the scope of the universal assembly kit principle pursued by the invention, the cross-sectional shape of the conveyor path rail, or of the track rail or carrier rail, respectively, by itself is here again utilized for the conception of the support frame or support grid. As the elements cooperating with one another are based on the cross-sectional shape of the track rail, they are readily connected to one another in a perfect fit. The provisions and preparation of special rails and supports is rendered superfluous, and the assembly is simplified.

The basic rail profile of the invention may even be used for providing supports or wall-mounted rails for mounting the conveyor path.

Laborious welding, rivetting or bolting operations are no longer required. A connection of this type is advantageous for the original erection of a conveyor path as well as for subsequent modifications, extensions and non-destructive dismounting thereof.

An important advantage of one embodiment of the invention is that the specified mounting members may be used for providing bends, curves and inclinations at angles other than 90°.

Light metals or light metal alloys are well suited for being readily and economically extruded to the desired cross-sectional shape of the track rail of the invention at practically endless lengths, the extruded product being very accurately shaped, corrosion-resistant, low-weight, wear-resistant and aesthetically pleasant. The lower specific load-carrying capacity of the material as compared to steel is more than compensated by the selected cross-sectional shape of the track rail.

Track rails or conveyor path rails, respectively, of synthetic materials may be very useful for low-load applications. In rails made of a synthetic material it may be particularly important to provide a reinforcement in the cavity defined by the transverse web and the legs, or in the legs themselves. The employ of synthetic materials results in low-noise travel of the track rollers. The formation of bends is particularly facilitated by the resiliencey of the material.

Embodiments of the invention shall now be described with reference to the drawings, wherein:

FIG. 9 shows a cross-sectional view of a support composed of members based on the track rail of FIG. 1, FIG. 11 shows a cross-sectional view of an inclined suspension conveyor path including auxiliary installations, FIGS. 12a, b show cross-sectional views of a container conveyor path with a conveyor path rail in a reclining position.

Figure 1:
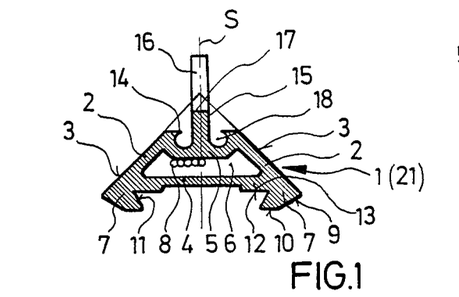
FIG. 1 shows a cross-sectional view of a track rail.
Figure 2:
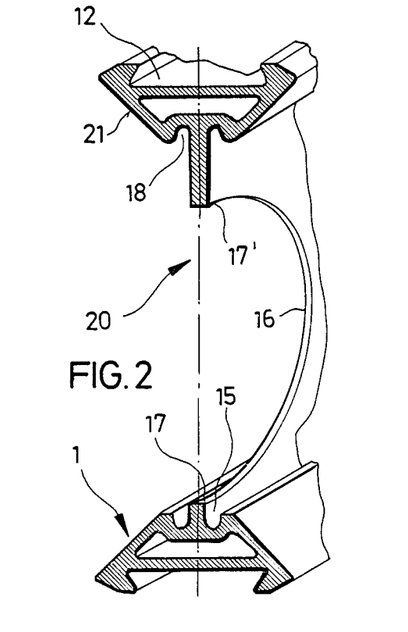
FIG. 2 shows a perspective cross-sectional view of a suspension conveyor path rail integrally incorporating the track rail of FIG. 1, FIGS. 3a, b show cross-sectional views of tow modified suspension conveyor path rails with increased load-carrying capacity, FIGS. 4a, b show the track rail of FIG. 1 with auxiliary components in cross-sectional representation, FIGS. 5a, b, c show the track rail of FIG. 1 with other auxiliary components, FIGS. 6a, b show cross-sectional views of the track rail of FIG. 1 with further auxiliary components.

A track rail 1 shown in FIG. 1, for instance a continuous casting or extruded member of a light metal or a light metal alloy, may either be used by itself or, as shown in FIG. 2, integrally formed with a carrier web 15 and a carrier rail 21, resulting in a conveyor path rail 20 in which carrier rail 21 is disposed mirror image-wise opposite track rail 1. As shown in FIG. 1, track rail 1 has a pair of upwards converging, roof-shaped legs 2, the outer sides of which form roller tracks 3 for track rollers 54 and 55 of a track roller pair 53 shown for instance in FIG. 5a, track rollers 54, 55 being mounted on inclined axes 56 in a yoke 57 carrying (not shown) carrier means attached thereto. Below track rail 1 yoke 57 is formed with a recessed portion permitting track rollers 54, 55 to be raised for removal. Track rail 1 is of symmetric shape with respect to a vertical symmetry plane S. Legs 2 are interconnected by a transverse web 4 extending perpendicular to symmetry plane S. The upper ends of legs 2 terminate at transverse spacings from symmetry plane S and are interconnected by a web 5 extending substantially parallel to transverse web 4. Transverse web 4 cooperates with the inner faces of legs 2 and web 5 to define a cavity 6 optionally provided with longitudinal reinforcements embedded therein. The free space of cavity 6 may be used for accommodating power supply cables and the like.

Integrally formed with the free ends of legs 2 are projections 7 comprising inclined guide surfaces 9 and guide faces 10 extending parallel to transverse web 4. The angle included by guide surfaces 9 and symmetry plane S is 60°, while the angle between roller tracks 3 and symmetry plane S is about 45°. Projections 7 cooperate with transverse web 4 to define a dovetail groove 12 opening towards the bottom of track rail 1 and having undercut surfaces 11 as its outer boundary. Adjacent surfaces 11 the underside of transverse web 4 may be formed with guide surfaces 13.

In the embodiment shown web 5 has a planar top surface 14 and is integrally connected to a carrier web 15 extending upwards in the symmetry plane S. On both sides of carrier web 15 web 15 is formed with longitudinal grooves 18 preferably of an undercut configuration.

Carrier web 15 is formed with windows 16, the lower window edge 17 of which extends below the imaginary point of intersection of roller tracks 3 in symmetry plane S.

Track rail 1 is primarily intended to be used in the position shown in FIGS. 1 and 2, in which carrier web 15 extends vertically. In the case of a different orientation of conveyor path rail 20 (FIG. 2), for instance, in a container conveyor path 63, 67 shown in FIG. 12a, 12b, in which rail 20 is rotated about 90°, the track rollers 54, 55 of the associated yoke 57 may also travel simultaneously on roller tracks 3 of track rail 1 and carrier rail 21. The neutral chord of the cross-section of track rail 1 when used by itself extends substantially within transverse web 4 or immediately on its surface, while in the case of conveyor path rail 20 it extends substantially along the longitudinal center axis in carrier web 15.

In the conveyor path rail 20 shown in FIG. 2, which is integrally formed as an extruded profile member, carrier rail 21 has substantially the same cross-sectional shape as track rail 1 and is disposed mirror image-wise opposite thereto. The actual position of the neutral chord is also determined by the asymmetry of windows 16 in carrier web 15. The upper window edge 17' of each window 16 is spaced from carrier rail 21 by a greater distance than lower window edge 17 from track rail 1. Windows 16 may be formed as elongate openings or circular holes. Carrier web 15 extends continuously over the length of conveyor path rail 20. Within one and the same conveyor path (see for instance FIG. 13), the conveyor path rail may selectively be mounted with carrier rail 21 uppermost or with track rail 1 uppermost in which case carrier rail 21 acts as the track rail proper. The selected mounting position is determined among other factors by the consideration whether a derail section or a derail prevent section is to be provided by making use of the asymmetry of windows 16, as will be explained.

Figures 7, 8, 10:
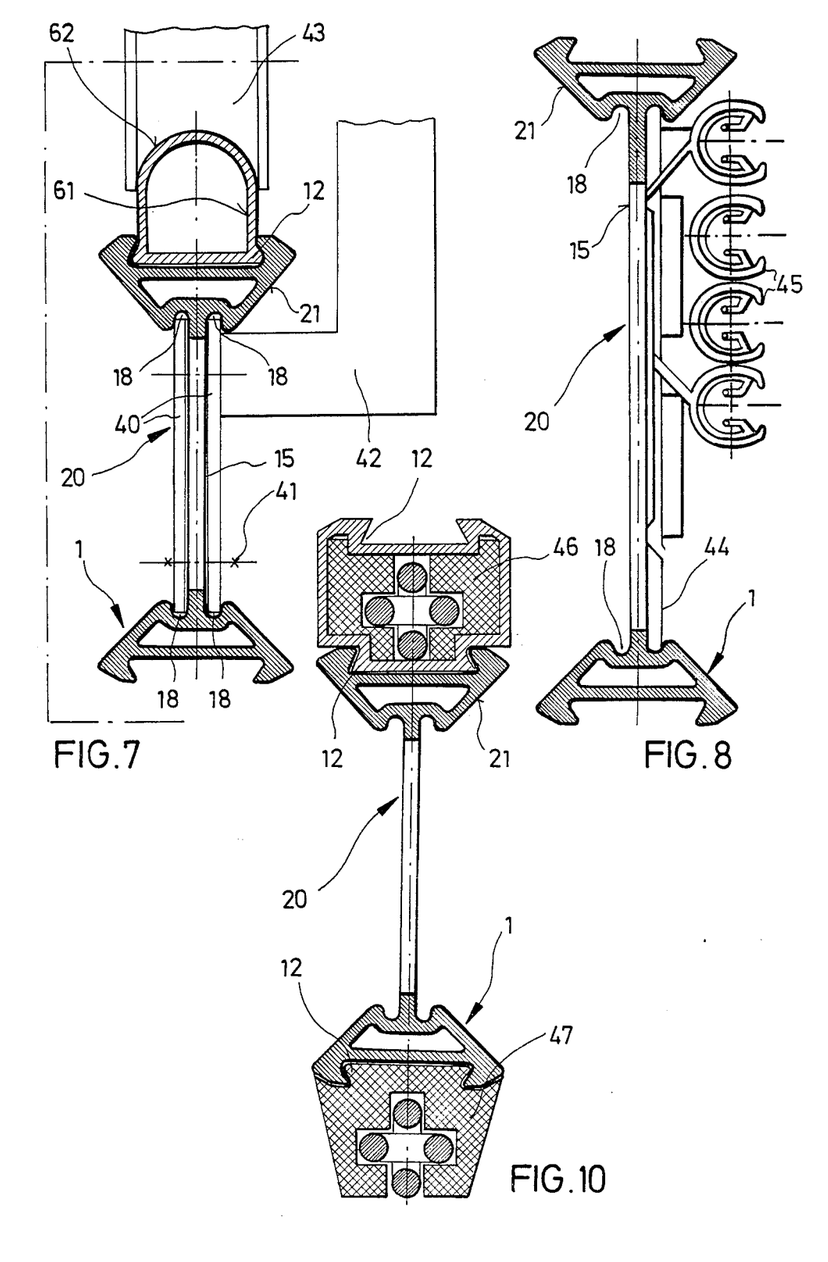
FIG. 7 shows a cross-sectional view of a suspension conveyor path with a complementary function.
FIG. 8 shows a cross-sectional view of a conveyor path with auxiliary components secured thereto.
FIG. 10 shows a cross-sectional view of a suspension conveyor path with auxiliary installations.
Figure 13:
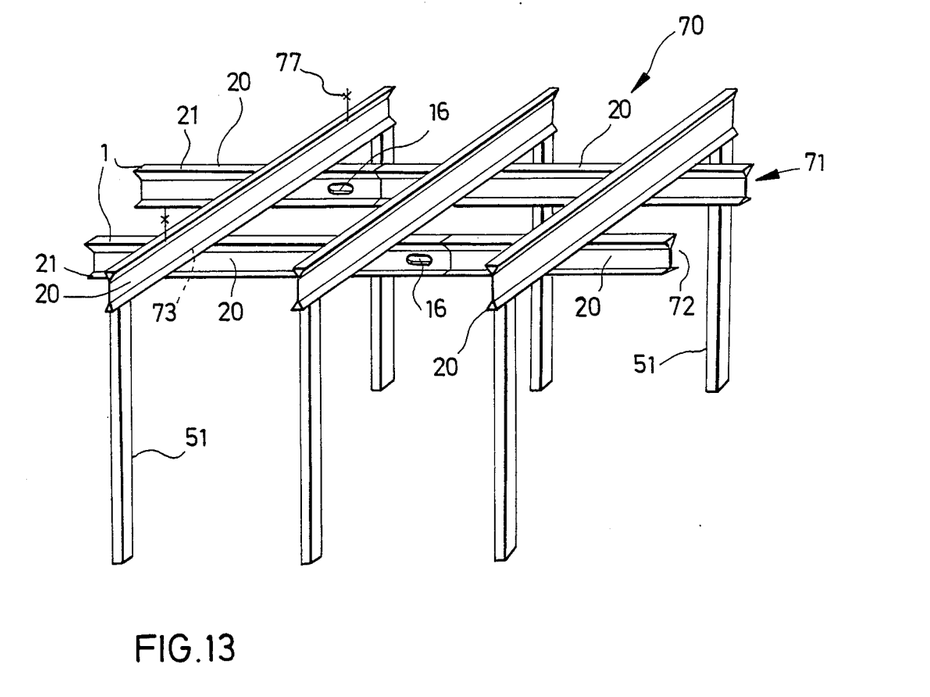
FIG. 13 shows a portion of a mounted conveyor path.

Roller tracks 3 of track rail 1 shown in FIG. 1 may be provided with plastic track layers preferably secured by locking engagement with longitudinal grooves 18 and dovetail groove 12. The conveyor path rail 20 shown in FIG. 2 may be secured to a support frame or support grid 70 as shown in FIG. 13 by means of mounting members 73 (cf. FIG. 14) inserted into dovetail groove 12 of carrier rail 21 or (in the other mounting position) of track rail 1, or by means of a mounting element engaging the legs of carrier rail 21 from the exterior. The rail may also be laterally mounted by means of mounting elements 40, 42 received in longitudinal grooves 18 (FIG. 7).

Figure 3A:
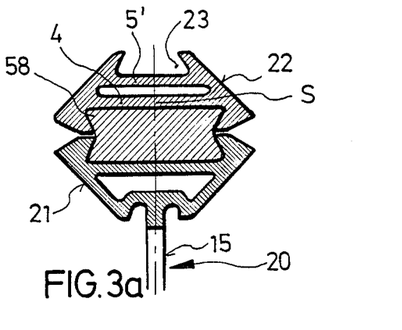

In the embodiment of the conveyor path rail 20 according to FIG. 3a carrier rail 21 is combined with another rail 22, for instance by means of connecting members 58 inserted into dovetail grooves 12 or by means of fastening bolts located in the symmetry plane S to thereby increase the rigidity and load-carrying capacity of conveyor path rail 20. The cross-sectional shape of rail 22 substantially corresponds to that of track rail 1 or carrier rail 21, respectively. Rail 22 is not, however, provided with a carrier web 15, but an upwards opening dovetail groove 23 for suspension components and a planar web 5' spaced from transverse web 4 by a smaller distance than web 5 of the track rail of FIG. 1 is spaced from transverse web 4.

Figure 3B:
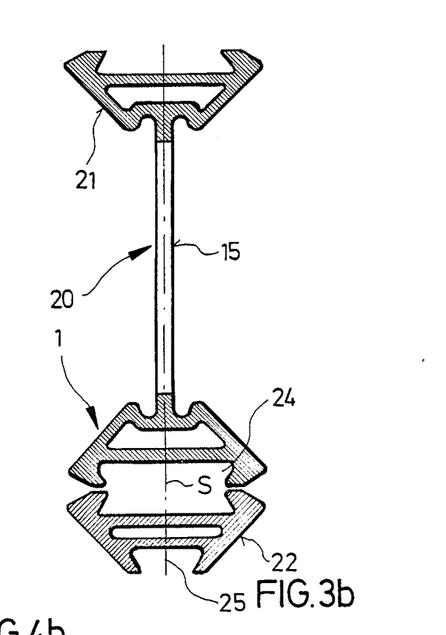

In the embodiment of FIG. 3b, rail 22 is secured to track rail 1. For instance by means of fastener elements 25 in the symmetry plane, so that there remains an open space 24. Rail 22 is in abutment with surfaces 10 on projections 7 of track rail 1 and does not interfere with the use of roller yoke 57.

Figure 4A:
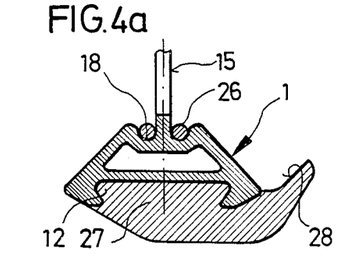

Track rail 1 shown in FIG. 4a is provided with a single-lobe roller track 27 mounted in dovetail groove 12 and having a roller track 28 cooperating with roller track 3 to provide a track channel for a roller system having an upright roller 32, which may be mounted on a lateral-suspension roller yoke 57. It is an important feature of this construction that it enables track roller pairs 53 with their roller yoke 57 extending around roller track 28 out of contact therewith and track rollers 32 with their laterally suspended roller yokes 57 to be employed alternatively or simultaneously.

The abutting ends of adjacent conveyor path rails may be provided with coupling or centering pins 26 inserted into respective longitudinal grooves 18 (FIG. 4a).

Figure 4B:
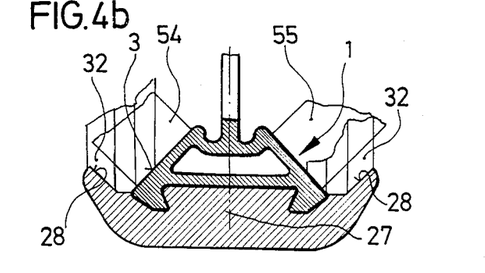

In the embodiment of FIG. 4b there is provided a two-lobe roller track 27' having two track portions 28 enabling roller yokes 57 with upright rollers 32 to travel along both sides of track rail 1. This embodiment likewise permits simultaneous use of roller pairs 53 shown in FIG. 5a. Roller tracks 27 or 27' may also be provided as an integral construction with track rail 1 for the installation of a system using different roller arrangements.

Figures 5A, 5B, 5C, 6A, 6B, 9, 11:
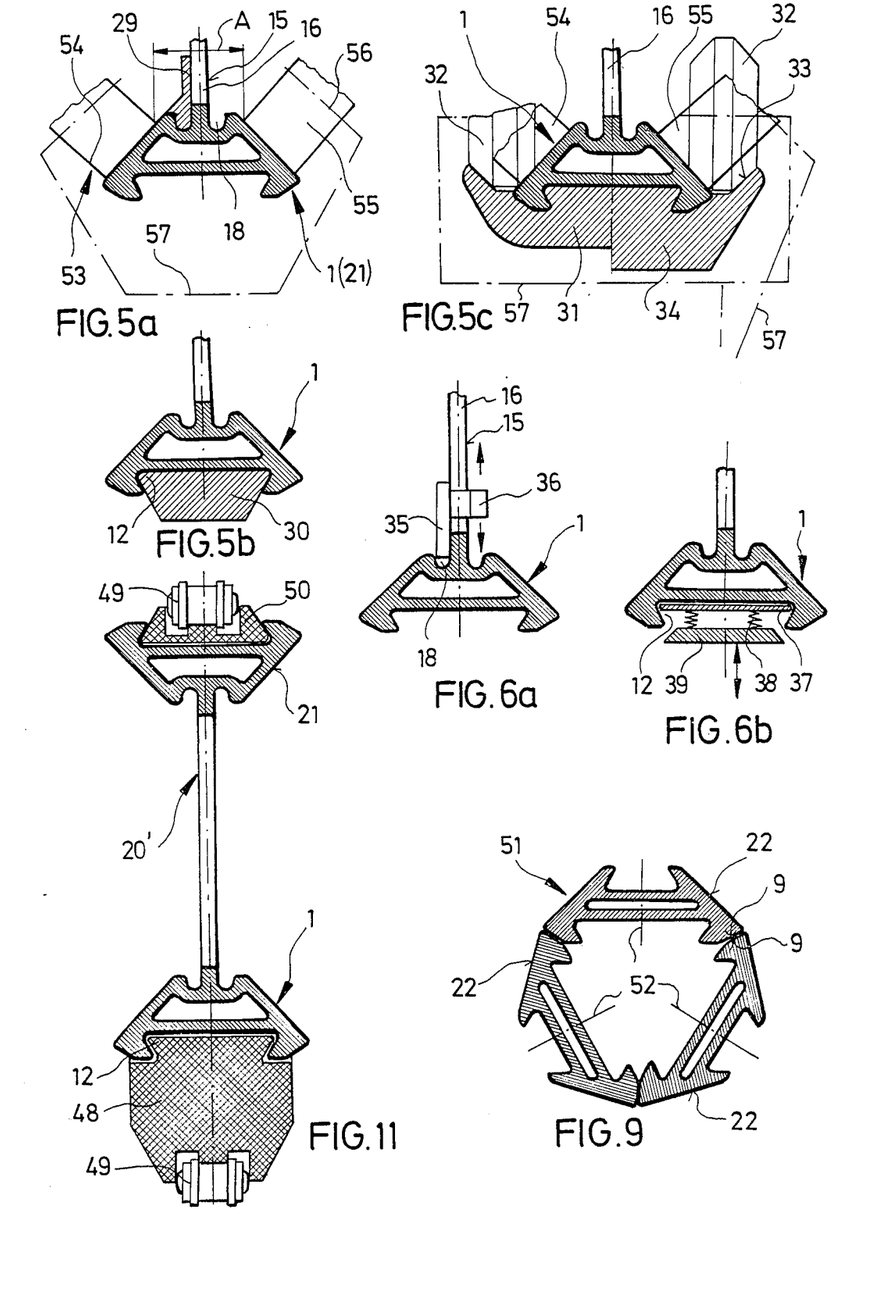

FIG. 5a shows the manner in which track rollers 54 and 55 of track roller pair 53 are supported on track rail 1. Rollers 54 and 55 are mounted on roller yoke 57 for rotation about inclined axes 56, their peripheral boundaries defining a derail gab having a derail gap width A permitting track roller pair 53 to be derailed or detached from track rail 1 according to FIG. 1 or FIG. 5a. To this purpose roller pair 53 is raised and subsequently rotated by about 90°, whereupon it is laterally withdrawn. This is permitted by the distance between the underside of transverse web 4 and lower window edge 17 being smaller than derail gap width A (FIG. 1). In the embodiment of FIG. 5a, however, there is provided a derail prevention means in the form of a stop member 29 inserted into longitudinal groove 18 of track rail 1 and secured in position therein. It is formed with an upstanding rim portion preventing track roller pair 53 from being derailed. The derailing operation of facilitated by a suitably shaped recess formed in yoke 57 below track rail 1.

The embodiment of FIG. 5b is provided with derail prevention means in the form of a block 30 secured in dovetail groove 12 at locations were derailing or detaching of the track roller pair is to be prevented for safety reasons. Block 30 projects beyond the underside of track rail 1 so as to prevent track roller pair 53 from being laterally withdrawn.

In the embodiment of FIG. 5c, the additional roller track 27' of FIG. 4 is formed as a shaped member 31 having a raised section 34 forming a derail prevention means for another roller system with vertically aligned rollers 32 travelling on roller tracks 33 and 3. At the location of raised section 34 the diagrammatically shown yoke 57 connected to track rollers 32 cannot be lifted to a height permitting track rollers 32 to pass over roller tracks 33. The derail prevent section 34 is also effective in the case of a single lateral-suspension roller 32.

In FIG. 6a a selectively operable derail prevention means in the form of a slide member 35 having an actuation projection 36 is mounted on carrier web 15 in such a manner that it can be extracted from longitudinal groove 18 and pushed upwards to a height permitting track roller pair 53 to be derailed. As long, however, as the derail prevention member is engaged in longitudinal groove 18 it is effective to prevent derailment through the respective window 16.

In the embodiment of FIG. 6b, the track roller pair can be derailed after a stop member 39 has been pushed into dovetail groove 12 against the force of springs 38, the assembly being retained in groove 12 by a plate member 37.

The derail prevention means of FIGS. 5a, 5b, 5c, 6a and 6b may be positioned at practically any location along track rail 1 or conveyor path rail 21.

The conveyor path rail 20 shown in FIG. 7 is adapted to the simultaneous use of two different track roller systems. To this purpose dovetail groove 12 of carrier rail 21 contains a longitudinally extending auxiliary rail 61 having an upwards facing convex roller track 62 for the travel therealong of a vertically upright roller 43 having a suspension yoke mounted on its lefthand side as indicated in phantom lines. Conveyor path rail 20 is laterally mounted by means of mounting members 40 inserted into longitudinal grooves 18 of track rail 1 and carrier rail 21 on both sides of carrier web 15 and secured in position therein by means for instance of fastener elements 41. Secured to plate-shaped mounting members 40 is a laterally projecting cantilevered suspension attachment 42. In the embodiment of FIG. 7, track rail 1 is adapted for travel thereon of the track roller pairs 53 according to FIG. 5a and at the same time of track rollers 43.

In the embodiment of FIG. 8, conveyor path rail 20 is designed with increased height of the carrier web. Inserted into longitudinal grooves 18 of track rail 1 and carrier rail 21 at one side of carrier web 15 is a support plate 44 secured in position therein and carrying mounting brackets 45 for power cables and the like. Brackets 45 may thus contain slide contact means for an electrically operated suspension conveyor system.

FIG. 9 shows a support assembly 51 which may be used for supporting a suspension conveyor path or for the assembly of a support frame 70 (FIG. 13), and consists of rails 22 as employed in FIGS. 3a and 3b. Rails 22 are positioned at angles of 120 relative to one another and bolted together by means of fastener elements 52 with their surfaces 9 contacting one anoher. Supports of this type may also be assembled by the use of track rail sections 1 shown in FIG. 1. In a similar manner two or four rails may be interconnected. It is also possible to assemble planar wall-mounting rails in this manner. Such supports may likewise be formed by the employ of conveyor path rail 20, i.e. on the base of the cross-sectional shape of track rail 1 as shown in FIG. 1 or of conveyor path rail 20 as shown in FIG. 2 it is possible to provide assembly kit type structural elements required for mounting or erecting a conveyor system.

In the embodiment of FIG. 10, conveyor path rail 20 is designed for use in a looped-link chain conveyor, a return chain run 46 being guided in dovetail groove 12 of carrier rail 21, and an active chain run 47 in dovetail groove 12 of track rail 1.

FIG. 11 shows a conveyor path rail 20' of an inclined conveyor path wherein chain guides 48 and 50 for guiding the active and return runs of a roller chain 49, respectively, are mounted in dovetail groove 12 of track rail 1 and carrier rail 21, respectively.

Figure 12A:
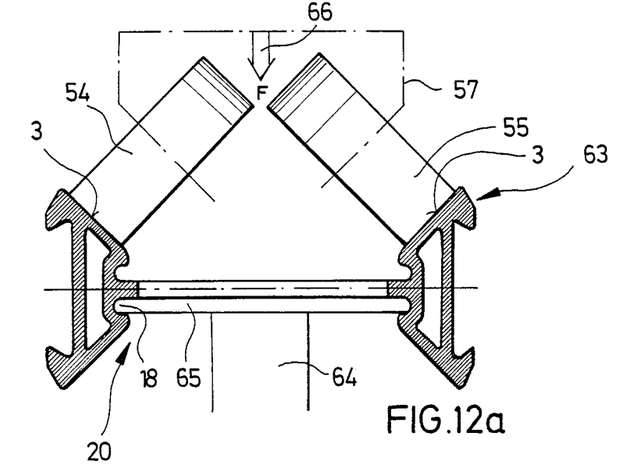
Figure 12B:
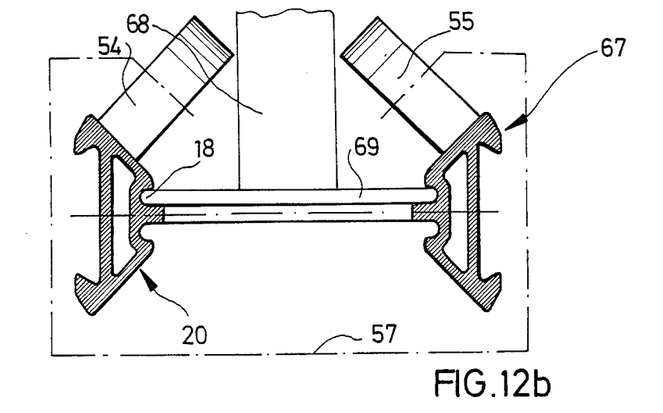

Shown in FIGS. 12a and 12b is a conveyor path rail 20 mounted at an orientation rotated by 90° relative to the above described mounting positions, for use in a container conveyor system 63 or 67, respectively. According to FIG. 12a, the reclining conveyor path rail 20 is mounted on a bottom support assembly by means of a mounting member inserted into grooves 18 and secured in position therein. Track rollers 54 and 55 are mounted on roller yoke 57 for travel along the upwards facing, V-shaped divergent roller tracks 3 of track rail 1 and carrier rail 21 of conveyor path rail 20. Diagrammatically indicated at 66 is a load carried on roller yoke 57.

In FIG. 12b the reclining conveyor path rail 20 is suspended from above by means of a mounting member 69 engaging grooves 18 and a central suspension element 68, with track rollers 54 and 55 travelling along opposite sides thereof and mounted on a roller yoke 57 extending around conveyor path rail 20 from below. The load, i.e., a not shown container is suspended from roller yoke 57.

Shown in FIG. 13 is a portion of a conveyor system mounted in a support frame or support grid 70 and having two parallel tracks 71, 72 mounted side by side and composed of abutting conveyor path rails 20. The support frame is likewise composed of suitable lengths of conveyor path rail 20 forming upper beams supported above the ground on columns 51. The crossbeams formed of conveyor path rails 20 may also selectively be secured to roof suspension means 77. The conveyor path rails 20 of the two tracks 71 and 72 ar secured to the underside of the cross beams, for instance by means of mounting members 73 shown in an enlarged perspective view in FIG. 14, mounting members 73 being inserted into the facing dovetail groove 12 of track rails 1 and carrier rails 21, respectively, in a manner not shown in FIG. 13. In the case of track 71, each conveyor path rail 20 has its carrier rail 21 secured to the cross beams of frame 70, so that the respective track rails 1 are lowermost. In this arrangement windows 16 are disposed closely adjacent track rail 1 to allow the rollers to be derailed along this track. In track 72 conveyor path rails 20 are mounted at inverted positions and secured to the cross beams by their track rails 1, so that carrier rails 21 are lowermost for the roller pairs to travel thereon. Since due to the asymmetric position of windows 16 the distance between the now lower window edge and carrier rail 21 is too large for permitting the roller pairs to be derailed, this arrangement constitutes a derail prevent section of the track.

Figure 14:
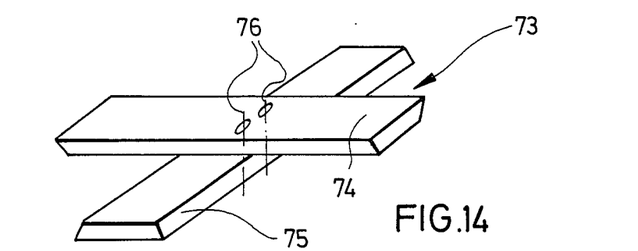
FIG. 14 shows a detail from FIG. 13.

The mounting member 73 shown in FIG. 14 comprises two cross-wise arranged and interconnected slide block members 74, 75 which may be of integral construction or releasably interconnected by fastener means 76, in which latter case the position of slide block members 74 and 75 relative to one another is adjustable. This arrangement permits slide block members 74 and 75 to be separately inserted into dovetail groove 12 and to be subsequently interconnected during assembly operations, for instance by means of tools inserted through the legs of the carrier rail.

The above described construction kit conception of the track rail alone and of the conveyor path rail, optionally in combination with rails 22 permits a higher load carrying capacity to be achieved than formerly possible at comparative expenditure. The track rail 1 and the carrier web 15 with the carrier rail 21 are not necessarily to be extruded of a light metal or light metal alloy, it being also possible to provide a press-formed or welded sheet metal construction or a construction of synthetic materials, for instance glass-fiber reinforced synthetic resins. Also imaginable is a compound construction of different materials. All of these embodiments have in common a relatively low weight per unit length, a high load carrying capacity, and high torsion and bending strength. The pairing of materials with the track rollers to be employed can be readily optimized with a view to wear and running noise. The cross-sectional shape of the rails according to the invention permits various auxiliary components and mounting elements to be readily mounted. The cross-sectional shape of track rail 1 facilitates the provision of ascending and descending track sections as well as transitions thereof into horizontal track sections and the formation of bends in the horizontal plane. Derail sections and derail prevent sections can be provided in a similarly simple manner. The employ of suitable mounting members permits the conveyor path to be selectively adapted to roof suspension, lateral mounting and ground support, since the cross-sectional shape of the rails is already designed to comply with possible additional requirements. A conveyor system composed of track rails 1 or conveyor path rails as depicted in the figures of the drawing may also originally be designed or subsequently adapted by the use of auxiliary components for use with different track roller systems, so that even different roller systems may be used at the same time. A further possible application is in container conveyor systems with reclining orientation of the conveyor path rails, i.e., rotation thereof by an angle of 90°. The conveyor path rail is also well suited for use in electric suspension conveyor systems, as the carrier web or the carrier rail permits slide contact rails or the like to be readily mounted thereon. As the track rail 1 is formed with surfaces that are inclined at different angles and merge into one another, there is the possibility of alternately or simultaneously employing track roller arrangements or other carriage means having track rollers mounted at different angles. In the case of power-driven conveyor sections it is possible to integrate novel power drive concepts into the rails of the track section, for instance chain conveyors or the like. Carriage means may also travel on the carrier rail in the case of a laterally mounted or center-suspended conveyor track. The track sections need not be welded, since connections of similar strength can be obtained in a more simple manner. In the case of light metals or light metal alloys as the starting material the provision of any final processing of surface finishing treatment is not required. An eloxation treatment may be provided, however, for decorative purposes and for improved surface properties. It is also possible to provide different colorings to thereby distinguish track sections of different importance.

What is claimed is:

1. In a track rail for a suspension conveyor system for the conveyance of materials, said track rail having a cross-sectional configuration comprising a pair of upwardly converging legs each formed with a roller track surface for one of a pair of track rollers on its upper side, and connected to a carrier rail by an upper carrier web extending in a cross-sectional symmetry plane for the track rail, said track rollers of said track roller pair defining a derail gap and being mounted in a common yoke with their axes in oblique alignment relative to one another, permitting them to be detached from said track rail by lifting said yoke and tilting it transversely of said track rail, the improvement comprising:

a transverse web formed between said legs integrally therewith and extending transversely of said symmetry plane so as to join said legs at a point where they converge upwardly, to define a closed cavity with said legs.

2. In a track rail for a suspension conveyor system for the conveyance of materials, said track rail having a cross-sectional configuration comprising a pair of upwardly converging legs each formed with a roller track surface for one of a pair of track rollers on its upper side, and connected to a carrier rail by an upper carrier web extending in a cross-sectional symmetry plane for the track rail, said track rollers of said track roller pair defining a derail gap and being mounted in a common yoke with their axes in oblique alignment relative to one another, permitting them to be detached form said track rail by lifting said yoke and tilting it transversely of said track rail, the improvement comprising:

a transverse web formed between said legs integrally therewith and extending transversely of said symmetry plane so as to define a closed cavity with said legs;

the upper end of said legs terminating at a transverse distance from said symmetry plane and being interconnected by a further web extending transversely of said symmetry plane.

3. A track rail according to claim 2, characterized in that said further web has said carrier web formed integrally therewith in lengthwise continuity.

4. A track rail according to claim 3, characterized in that said carrier web is formed with windows of a size corresponding at least to that of a track roller, and that at a derail section of said track rail the window edge adjacent said track rail of at least one of said windows is spaced from the underside of said transverse web - as seen in the vertical direction of said symmetry plane - by a distance smaller than the derail gap width of said roller yoke.

5. A track rail according to claim 4, characterized in that said window edge extends below the imaginary point of intersection of said roller tracks.

6. A track rail according to claim 4, characterized in that at a derail prevent section of said track rail the distance between said window edge and the underside of said transverse web is greater than said derail gap width.

7. A track rail according to claim 3, characterized in that said web is formed with upwards opening, preferably undercut longitudinal grooves at both sides of said carrier web.

8. A track rail according to claim 1, characterized in that adjacent said transverse web the lower ends of said legs carry projections facing towards said symmetry plane.

9. A track rail according to claim 8, characterized in that said projections or the free ends of said legs, respectively, are provided with support surfaces extending both obliquely and parallel to said transverse web for engagement with suspension or support means.

10. A track rail according to claim 9, characterized in that said projections and said transverse web define an undercut, particularly dovetail-shaped groove accessible from the underside of the rail.

11. A track rail according to claim 10, characterized in that by means of mounting members inserted in said dovetail groove, a rail having a cross-section substantially identical to that of said track rail is secured mirror image-wise to said track rail and/or to said carrier rail for increasing the load-carrying capacity of said conveyor path rail.

12. A track rail according to claim 10, characterized in that said dovetail groove is adapted to have inserted therein a single-lobe or two-lobe roller track for track rollers of a different track roller system not or only partially running on said roller tracks of said legs, the roller yoke of said track rollers running on said roller tracks straddling said inserted roller track without contacting it.

13. A track rail, particularly according to claim 12, characterized in that there are provided two roof-shaped converging roller tracks for center-suspension roller yokes, and at least one outwards and upwards extending roller track laterally adjacent one of said roller tracks for a track roller of a lateral-suspension roller yoke, so that said track rail is adapted for alternative and simultaneous travel thereon of center-suspension and/or lateral-suspension roller yokes.

14. A track rail according to claim 10, disposed in a derail prevent section of the conveyor path, characterized in that a barrier member is releasably mounted either in a longitudinal groove laterally of said carrier web or in said undercut groove.

15. A track rail according to claim 14, characterized in that said barrier member is adapted to be moved preferably against a spring force, from a barrier position to a derail position.

16. A track rail according to claim 14, characterized in that longitudinal grooves of said track rail and said carrier rail are adapted to receive fastener means for lateral suspension means, roof suspension means or ground suspension means, or coupling means for interconnected conveyor path rails.

17. A track rail according to claim 14, characterized in that said longitudinal groove is adapted to have fastener means for auxiliary installations such as power supply or control cables mounted therein.

18. A track rail according to claim 14, characterized in that within the dovetail groove of said track rail and said carrier rail there is disposed the leading run or the trailing run, respectively, of a chain suspension conveyor path or a chainlift conveyor path.

19. A track rail according to claim 8, characterized in that adjacent its connection to said legs said transverse web has its underside formed with raised guide and support surfaces.

20. A track rail, according to any one of claims 1–10 and 19, characterized in that said carrier rail is substantially identical to said track rail profile as regards its cross-section, size and arrangement of said track surfaces, and that said carrier rail, said carrier web and said track rail are integrally formed as a conveyor path rail wherein said carrier rail is arranged mirror image-wise of said track rail, the conveyor path being composed of aligned and preferably interconnected conveyor path rails.

21. A track rail, particularly according to any one of claims 4 to 6, characterized in that said carrier web is integrally connected to said track rail and said carrier rail, said windows are located asymmetric with respect to the longitudinal center axis of said conveyor path rail so as to be closer to said track rail, and that, for providing a derail prevent section of said conveyor path, said conveyor path rail is rotated 180° about its longitudinal center axis and mounted with its carrier rail as said track rail and its track rail as said carrier rail, whereby the distance of the window edge then adjacent the track rail form the underside of said transverse web of said carrier rail now acting as the track rail is greater than said derail gap width.

22. A track rail according to claim 1, characterized in that a longitudinal reinforcement is provided in said cavity.

23. A track rail in a conveyor path, according to claim 1, wherein said conveyor path is secured to supporting means which is one of a support frame, a support grid and roof-mounted rails, characterized in that said supporting means is composed of one of conveyor path rails, track rails, and carrier rails, respectively, devoid of a carrier web.

24. A track rail according to claim 23, characterized in that track rails or rails having substantially the same cross-section as said track rial or said carrier rail, respectively, are adapted to be assembled to form supports for said support frame or said support grid, respectively.

25. A track rail according to claim 23, characterized in that adjacent said transverse web, the lower ends of said legs carry projections facing towards said symmetry plane, said projections and said transverse web defining mutually facing undercut grooves accessible from the underside of said rail, said conveyor rail of said conveyor path is secured to said support frame or said support grid, respectively, by means of slide block-type mounting members inserted in the mutually facing undercut grooves.

26. A track rail according to claim 25, characterized in that each mounting member comprises two slide block portions arranged crosswise and interconnected, preferably releasably and/or for adjustment to variable crosswise orientations.

27. A track rail according to claim 1, characterized in that it is extrusion-formed of a light metal or a light metal alloy, respectively.

28. A track rail according to claim 1, characterized in that it is roll-formed or welded of metal sheet or designed as a compound structure.

29. A track rail according to claim 1, characterized in that it is extrusion-formed of a glass fiber reinforced synthetic material.

30. A track rail in a conveyor path, according to claim 1, wherein said conveyor path is secured to supporting means which is one of a support frame, a support grid and roof-mounted rails, characterized in that said supporting means includes one of conveyor path rails, track rails, and carrier rails, respectively, acting as supports.

* * * * *